UNITED STATES PATENT OFFICE.

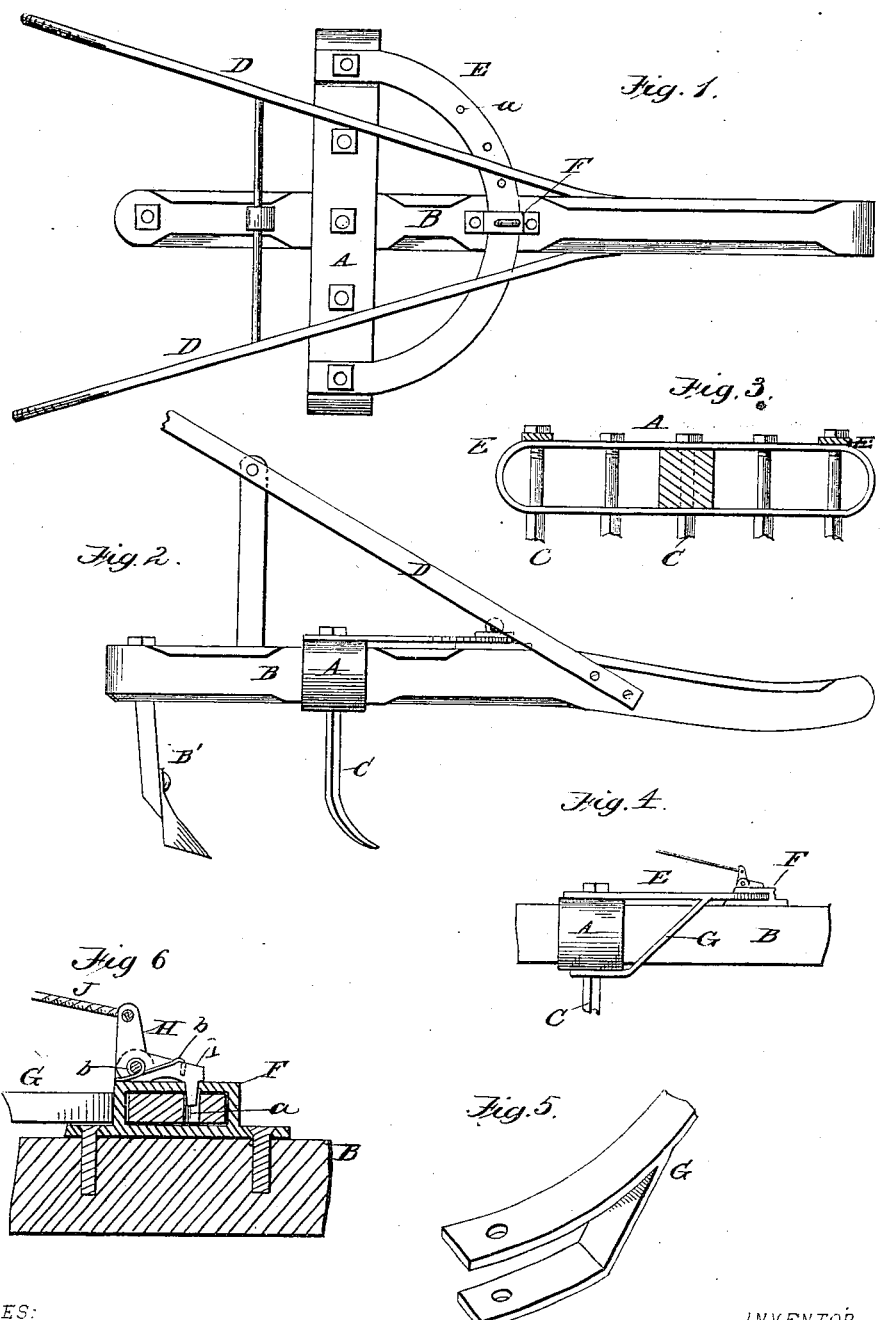

WILLIAM H. CARRUTH, OF BOLIVAR, ASSIGNOR OF ONE-HALF TO GEORGE W. RANDOLPH, OF MONTEZUMA, TENNESSEE.

HARROW AND CULTIVATOR.

SPECIFICATION forming part of Letters Patent No. 271,599, dated February 6, 1883.

Application filed October 27, 1882. (No model.)

*To all whom it may concern:*

Be it known that I, WILLIAM H. CARRUTH, a citizen of the United States, residing at Bolivar, in the county of Hardeman and State of Tennessee, have invented certain new and useful Improvements in Harrows and Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to an improvement in combined harrow and cultivator, and is adapted to permit the adjustment of the shovels or teeth at any desired angle to the plants or to the ground; and the nature of my invention consists in the combination and arrangement of parts substantially as hereinafter more fully set forth and claimed.

In the accompanying drawings, Figure 1 is a plan view of my improved combined harrow and cultivator. Fig. 2 is a side view thereof, and Figs. 3, 4, 5, and 6 are views of details thereof.

In carrying out my invention I employ a frame, A, preferably of an approximate link shape, as seen in Fig. 3.

B is the beam, extending right-angularly through and pivoted within the link cross-frame A by means of one of a series of teeth, C, passed through the frame and the beam, the rest of the said teeth passing through and bolted to said link-shaped frame A, as seen particularly in Fig. 3. At the rear end of said beam is bolted or secured the cultivator shovel or plow B'. The teeth C form the harrow portion of the machine, the beam having affixed to it the usual or ordinary handles, D.

E is a semicircular guiding-plate, with its ends fixed or bolted to the ends of the link-shaped frame A, while it also passes through a clip or staple, F, bolted to the top of the said beam. The semicircular plate E may be cast with an arm or brace, G, and when it is so constructed the arm or brace is bolted to and adapted to embrace the frame A, as seen in Figs. 4 and 5, to strengthen the implement.

H is a short lever, pivoted to one side of the clip or staple F, and having a pawl, I, held under the action of a spring, $b$, and adapted to pass through an aperture in said clip or staple to engage with any one of the adjusting-apertures $a$ in the plate E, as seen in Fig. 6, the purpose of which is to enable (by operating a cord or rod, J, connected to the upper end of the lever H and extending along one of the cultivator or harrow handles D and adjusted to its rear end) the adjustment and retention of the teeth or shovel at any desired angle for working the plants or pulverizing the ground, the beam, to which the draft is connected, being capable of turning, as above intimated, upon the harrow-tooth passing through it.

I attach importance to my link-shaped frame, which is strong and durable, and on substantially the same horizontal plane as the beam B, to which it is centrally and readily attached.

I am aware that it is old to hinge by means of a clip a supplemental beam to one side of a plow-beam and to connect them by a perforated arc, also that a cross-beam, having teeth secured thereto has been pivoted adjustably to the under side of a plow-beam.

Having thus fully described my invention, I claim and desire to secure by Letters Patent—

1. In a combined cultivator and harrow, the beam B, extending through and pivoted directly to the link-shaped cross-frame A, the latter being pivoted to and extending about equidistant from the beam B, and having harrow-teeth C, apertured plate E, having a brace, G, at each end thereof, clip F, and a locking device, all in combination as and for the purpose set forth.

2. In a combined cultivator and harrow, the combination of the beam B, provided at its rear end with a cultivator shovel or plow, B', the link-shaped cross-frame A, having harrow-teeth C, one of which forms a pivotal point for the beam B, and adjusting mechanism consisting of the serially-apertured curved plate E, apertured clip F, spring-pawl I, lever H, and operating medium J, as and for the purpose set forth.

In testimony whereof I affix my signature in presence of two witnesses.

WILLIAM H. CARRUTH.

Witnesses:
R. P. BIRKHEAD,
JNO. T. SENTER.